(No Model.)

I. E. MYRICK.
SEWING MACHINE TABLE.

No. 296,039.  Patented Apr. 1, 1884.

WITNESSES
Wm. M. Monroe.
Geo. W. King.

INVENTOR
Israel E. Myrick
by Leggett & Leggett
Attorneys

UNITED STATES PATENT OFFICE.

ISRAEL E. MYRICK, OF CLEVELAND, OHIO.

SEWING-MACHINE TABLE.

SPECIFICATION forming part of Letters Patent No. 296,039, dated April 1, 1884.

Application filed February 28, 1884. (No model.)

*To all whom it may concern:*

Be it known that I, ISRAEL E. MYRICK, of Cleveland, in the county of Cuyahoga and State of Ohio, have invented certain new and useful Improvements in Sewing-Machine Tables; and I do hereby declare the following to be a full, clear, and exact description of the invention, such as will enable others skilled in the art to which it pertains to make and use the same.

My invention relates to sewing-machine tables, and more especially to improved mechanism for supporting the driving-shaft, the object being to support the shaft on pivotal bearings at each end. A further object is to provide a spider with offset arms joining the frame, and leaving a space between the frame and the body of the spider, in which is located the driving-pulley, and the frame and the spider provided, respectively, with adjustable pivotal bearings for supporting the shaft firmly.

With these objects in view my invention consists in certain features of construction and in combination of parts hereinafter described, and pointed out in the claims.

With the usual construction of sewing-machine tables the driving-wheel is mounted on a laterally-projecting stud secured to the frame and extending inward, and the wheel is provided with an overhanging crank-pin to which is attached the pitman for propelling the machine. With this construction the stud is gradually decreased and the bore of the wheel increased in size by the wear of the parts, and both are worn "out of round" and the wheel caused to wabble by the action of the pitman. For this difficulty, which increases more rapidly as the machine becomes somewhat worn, there seems to be no remedy, except a renewal of the parts. I have therefore invented a combination of parts in which is provided a spider with offset arms joining the frame at widely-separated points to insure firmness, and with the driving-pulley mounted on a crank-shank journaled at the ends on pivotal bearings that are supported, respectively, by the spider and frame on the same axial line, and made adjustable on this line to take up the wear, and by means of which the wheel and shaft may be made to run true and with mere nominal friction and wear.

Figure 1:
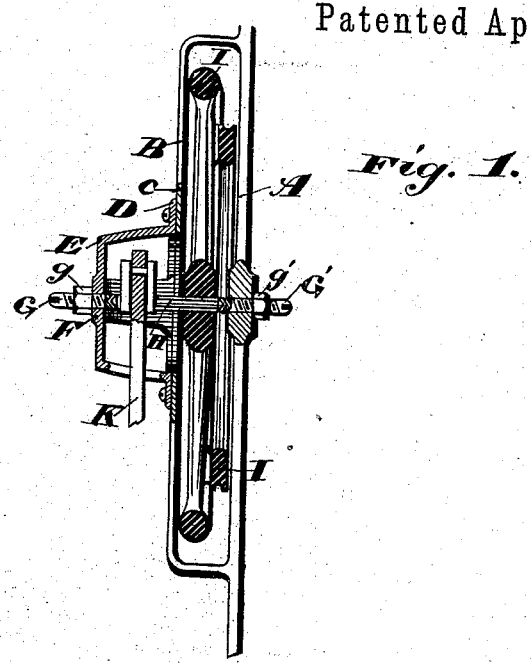
Figure 2:
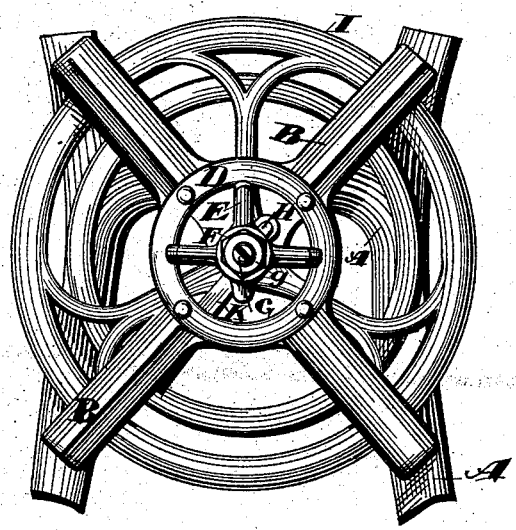

In the accompanying drawings, Figure 1 is a transverse vertical section of the frame, spider, wheel, shaft, and bearing. Fig. 2 is a side elevation of the same.

A represents the supporting-frame.

B represents the spider, the arms of which are offset near the ends and join the frame at widely separated points, and are preferably integral with the frame. The arms of the spider B join in a central flat ring, C. To this ring is removably attached a similar ring, D, that has offset arms E, that join in a central hub, F, that has a central threaded bore, in which is screwed the pivotal bearing G, that supports one end of the crank-shaft H, on which is mounted the driving-wheel I. A similar bearing, G', is screwed in the same manner to the frame A, the two pivotal bearings of course having a common axial line. The outer ends of these bearings are fitted for a wrench or screw-driver, so that they may be easily adjusted, and are respectively provided with the jam-nuts $g$ and $g'$, to secure the parts G and G' after they are adjusted.

By means of the offset in the arms of the spider B sufficient room is provided between the spider and the frame for the operation of the driving-wheel, and by means of the offset arms E room is provided for the crank.

In assembling the parts, by reason of the arms of the spider joining the frame at widely-separated points, the wheel may be inserted between the said arms, and when the ring D and the attached arms E are removed the shaft H may be inserted in the wheel, and when the parts D and E are again secured in position the shaft, with the wheel attached, may be mounted and adjusted on the pivotal bearings.

If preferred, the spider may be bolted to the frame, instead of being made integral therewith, in which case the parts D and E might be made integral with the spider B.

It will be observed that the arms E are so arranged that there is a wide space at the bottom through which to operate the pitman.

It is essential to the successful operation of the machine that the pivotal bearings be held so firmly that they cannot recede or spread apart in the slightest degree by the springing or vibration of the parts. In the construction shown the spider and frames secured to each other at the different points form a rigid support for these bearings for all practicable purposes.

I am aware that pivotal bearings for the crank-shaft of a sewing-machine have been secured to the ends of a yoke; and the yoke in turn secured to the frame; but the vibration and springing of the yoke rendered the device impracticable unless the yoke was made so heavy and clumsy as to be wholly unsuited to ordinary sewing-machines.

What I claim is—

1. In a sewing-machine table, the combination, with the frame provided with an adjustable pivotal bearing, of a spider with offset arms joining the frame on different sides and provided with an adjustable pivotal bearing arranged on the same axial line with the pivotal bearing of the frame, and the two bearings adapted to support the crank-shaft of the machine, substantially as set forth.

2. In a sewing-machine table, as a support for pivoted bearings for the crank-shaft, the combination, with the frame A, the spider B, provided with offset arms joined by the ring C, and the three parts, preferably integral with each other, of the ring D, detachably secured to the ring C, and provided with the offset arms E and the hub F, substantially as set forth.

In testimony whereof I sign this specification, in the presence of two witnesses, this 21st day of February, 1884.

ISRAEL E. MYRICK.

Witnesses:
CHAS. H. DORER,
ALBERT E. LYNCH.